(12) United States Patent
Chang et al.

(10) Patent No.: US 11,625,104 B1
(45) Date of Patent: Apr. 11, 2023

(54) CLICK PADS TRAVEL REDUCTIONS

(71) Applicant: Hewlett-Packard Development Company, L.P., Spring, TX (US)

(72) Inventors: Yi Yun Chang, New Taipei (TW); Hung Sung Pan, Taipei (TW); Chen Jie Wu, New Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/677,493

(22) Filed: Feb. 22, 2022

(51) Int. Cl.
*G06F 3/02* (2006.01)
*G06F 3/0354* (2013.01)
*H01F 7/20* (2006.01)

(52) U.S. Cl.
CPC ........ *G06F 3/0202* (2013.01); *G06F 3/03545* (2013.01); *H01F 7/20* (2013.01)

(58) Field of Classification Search
CPC ....... G06F 3/0202; G06F 3/03545; H01F 7/20

USPC ........................................................ 345/173
See application file for complete search history.

(56) References Cited

U.S. PATENT DOCUMENTS

| | | | |
|---|---|---|---|
| 2007/0052691 A1 | 3/2007 | Zadesky | |
| 2012/0154273 A1* | 6/2012 | McDade, Sr. | G06F 3/041 345/157 |
| 2017/0271101 A1 | 9/2017 | Huang | |
| 2019/0073036 A1 | 3/2019 | Bernstein | |
| 2019/0212861 A1* | 7/2019 | Monson | G06F 3/0446 |
| 2019/0348983 A1* | 11/2019 | Edgar | G06F 3/0338 |
| 2020/0117298 A1 | 4/2020 | Hsu | |
| 2021/0255711 A1* | 8/2021 | Wang | G06F 3/0213 |

* cited by examiner

*Primary Examiner* — Mark Edwards
(74) *Attorney, Agent, or Firm* — Knobbe, Martens, Olson & Bear, LLP

(57) ABSTRACT

In some examples, an electronic device includes a click pad. In some examples, the electronic device includes circuitry disposed under the click pad. In some examples, the circuitry is to activate to reduce click pad travel from a first distance to a second distance. In some examples, the circuitry is to activate in response to a stylus detection.

13 Claims, 4 Drawing Sheets

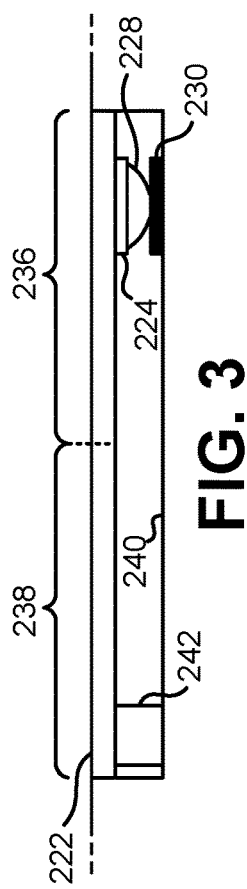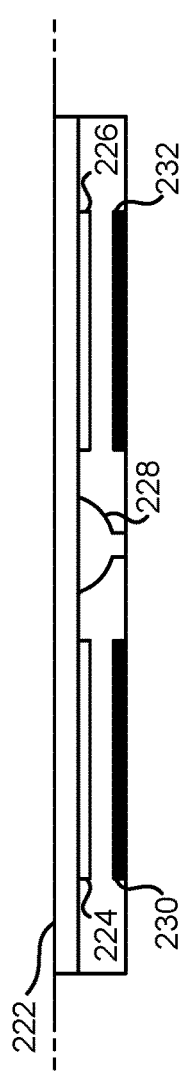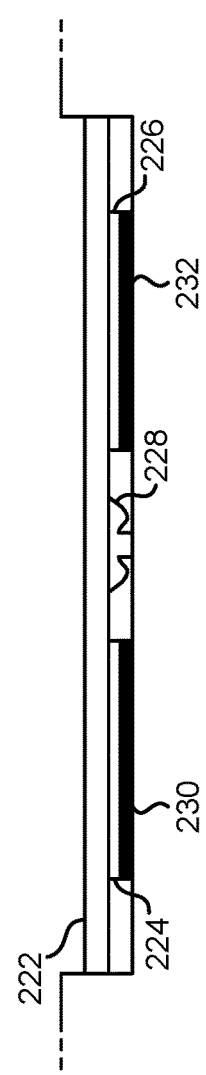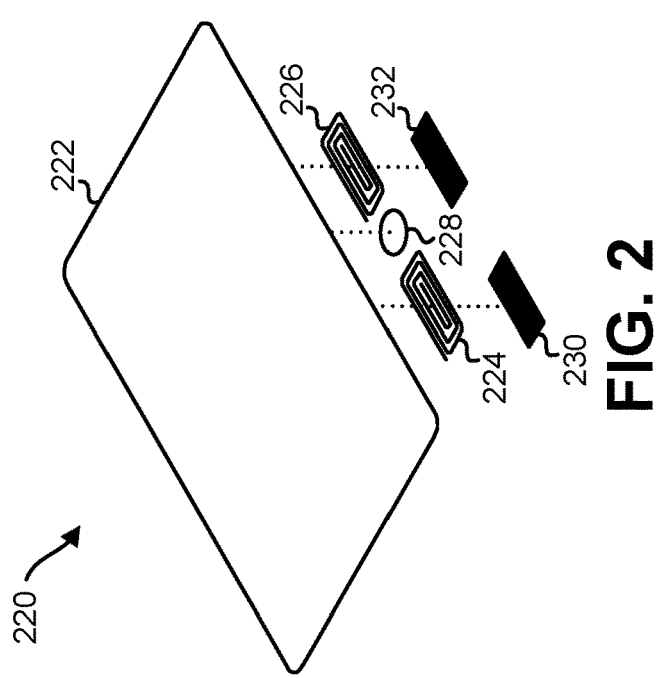

CLICK PADS TRAVEL REDUCTIONS

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

BRIEF DESCRIPTION OF THE DRAWINGS

FIG. 2 is a diagram illustrating an exploded perspective view of an example of an input device assembly for controlling click pad travel;

FIG. 3 is a diagram illustrating a side view of the example of the input device assembly;

FIG. 4 is a diagram illustrating a front view of the example of the input device assembly;

FIG. 5 is a diagram illustrating a front view of the example of the input device assembly in a depressed state;

DETAILED DESCRIPTION

Figure 1:
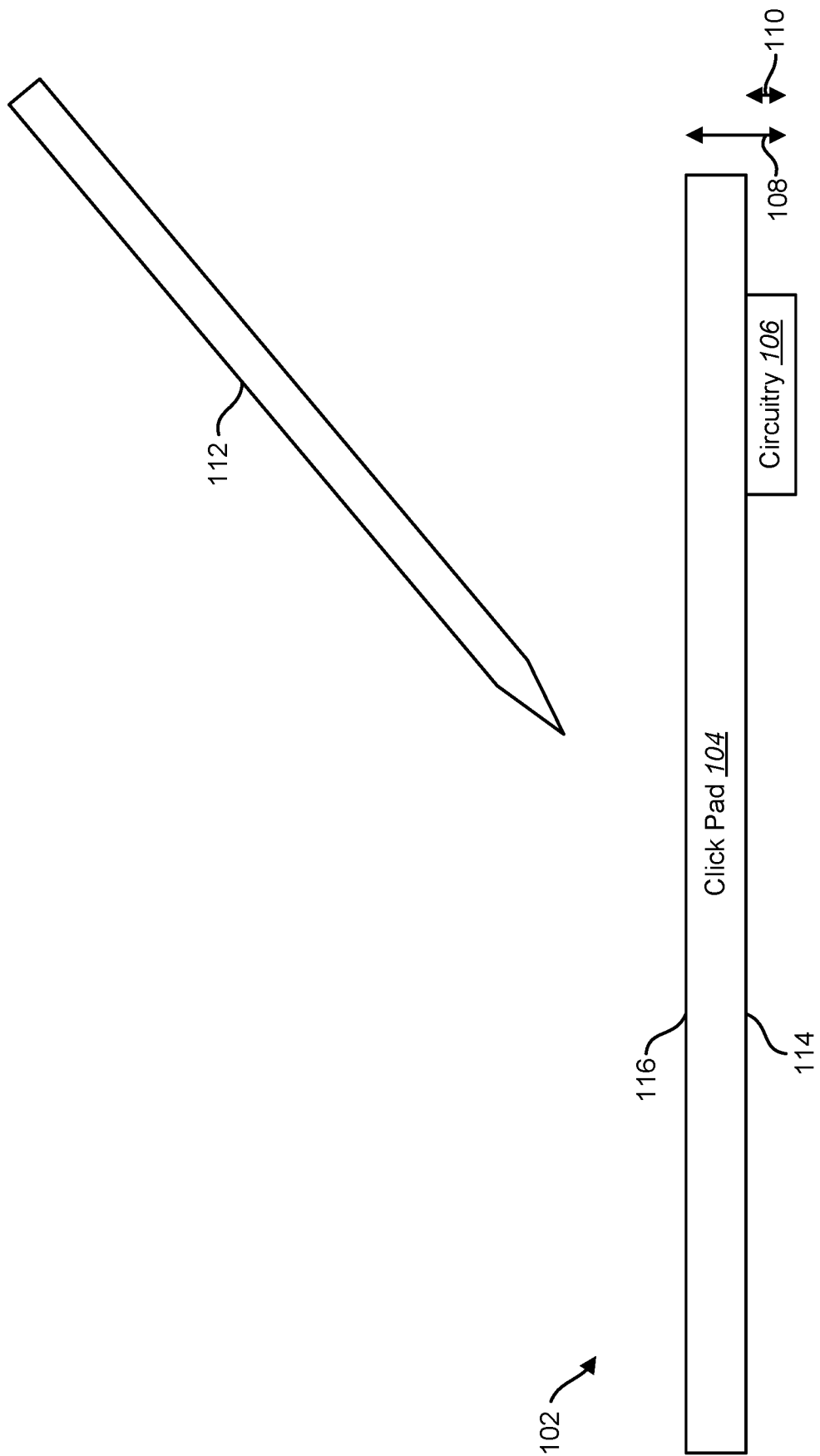
FIG. 1 is a block diagram illustrating a side view of an example of an electronic device to reduce click pad travel.

A stylus is an instrument with an end or point. For instance, a stylus may be an instrument for writing, marking, tracking, or a combination thereof. A passive stylus is a stylus without an active component(s) (e.g., without powered components, a battery, wireless communication circuitry, or a combination thereof). An active stylus is a stylus with an active component(s) (e.g., with a powered component(s), a battery, haptic device, wireless communication circuitry, or a combination thereof). For instance, an active stylus may be an example of an electronic device. The term "stylus" may refer to a passive stylus or an active stylus. In some examples, a stylus may be utilized on a writing surface to electronically indicate writing or marking. A writing surface is a surface on which a stylus may be utilized. Examples of writing surfaces include click pads, track pads, touch pads, touchscreens, pressure-sensing surfaces, etc. In some examples, movement of a stylus may be sensed (e.g., tracked) by the stylus, an electronic device with a writing surface, or a combination thereof to capture writing or marking. In some examples, contact between a stylus and a writing surface may be sensed (e.g., tracked) by the stylus, an electronic device with a writing surface, or a combination thereof to capture writing or marking.

An electronic device is a device that includes electronic circuitry (e.g., integrated circuitry, etc.). Examples of an electronic device include a click pad, touch pad, track pad, computing device (e.g., laptop computer, desktop computer), smartphone, tablet device, game console, digital notepad, and active stylus.

A click pad is a contact-sensitive or proximity-sensitive device with a pressure-sensitive (e.g., button, click, etc.) actuation feature. For instance, a click pad may include a surface (e.g., top surface, face, side, etc.) that is sensitive to contact from a stylus or finger. In some examples, the click pad may include capacitive circuitry to sense a contact location(s) or resistive circuitry to sense a contact location(s) of a stylus(es) or finger(s). In some examples, the pressure-sensitive actuation feature may allow travel (e.g., movement, deflection, flexion, depression, springing, hinging, elasticity, etc.) of the click pad. For instance, the click pad may be displaced under pressure of a finger or stylus. The pressure-sensitive actuation feature may be utilized to signal an event (e.g., button press, click, actuation, etc.). For instance, the travel of the click pad may allow actuation of a switch (e.g., dome switch, spring-loaded switch, etc.) when the click pad is under mechanical pressure. When the mechanical pressure is relieved, the click pad may return to a previous (e.g., non-depressed) position.

In some cases, a user may inadvertently actuate the click pad while using a stylus. For instance, if a user is drawing or signing with a stylus near a switch region of a click pad, a switch under the click pad may be inadvertently actuated. While pressure exerted on a click pad may be easier to regulate with a finger, a dome switch of a click pad may be easily triggered by the stylus during drawing or signing with a stylus (e.g., passive or active stylus). Some examples of the techniques described herein may be utilized to reduce the travel of a click pad when a stylus is used with the click pad. Reducing the travel of the click pad may reduce or avoid sensing an inadvertent pressing event (e.g., switch actuation, click, button press, etc.).

Throughout the drawings, similar reference numbers may designate similar or identical elements. When an element is referred to without a reference number, this may refer to the element generally, without limitation to any particular drawing or figure. In some examples, the drawings are not to scale and the size of some parts may be exaggerated to more clearly illustrate the example shown. Moreover, the drawings provide examples in accordance with the description. However, the description is not limited to the examples provided in the drawings.

FIG. 1 is a block diagram illustrating a side view of an example of an electronic device 102 to reduce click pad 104 travel. Examples of the electronic device 102 include an input device assembly (e.g., click pad assembly, click pad module, etc.), computing device (e.g., laptop, desktop computing device, tablet device, smartphone, etc.), computing device component (e.g., laptop body, chassis, laptop housing, etc.), etc. In the example of FIG. 1, the electronic device 102 includes a click pad 104 and circuitry 106. In some examples, components of the electronic device 102 may be coupled via an interface(s) (e.g., bus(es), wire(s), connector(s), etc.). In some examples, the electronic device 102 may include additional components (not shown) or some of the components described herein may be removed or modified without departing from the scope of this disclosure. In some examples, the click pad 104, circuitry 106, or a combination thereof may be coupled to a motherboard, processor, or controller of the electronic device 102 (e.g., a laptop). In some examples, the click pad 104 may be disposed in a well or depression of a housing (not shown in FIG. 1) of the electronic device 102. In some examples, the click pad 104 may be housed in an enclosure, cage, or housing. For instance, the click pad 104 may be included in a removable structure (e.g., module) of the electronic device 102.

The click pad 104 may include a contact side 116 and an underside 114. The contact side 116 may be a surface where contact (e.g., contact, contact location, etc.) may be detected by the click pad 104. For instance, the click pad 104 may detect or sense a location of a contact (e.g., a location where a finger(s) or stylus(es) contacts the click pad 104) on the contact side 116. In some examples, a portion (e.g., peripheral region) of the click pad 104 may be disposed under (e.g., covered by) a lip of a chassis of the electronic device 102.

An underside 114 of the click pad 104 may be an opposite side (e.g., surface) of the click pad 104 from the contact side 116 through the click pad 104. In some examples, the underside 114 of the click pad 104 may be a side or surface of the click pad 104 that is concealed in the electronic device 102 (e.g., in a housing of a laptop, below an outer surface of the electronic device 102, in a case of a digital notepad, etc.). In some examples, the underside 114 of the click pad 104 may be behind the contact side 116.

The click pad 104 may be disposed to travel. Travel is a movement or freedom to move. For instance, the click pad 104 may be disposed to move in a direction or directions. In some examples, the click pad 104 may travel via a shift, bend, displacement, pivot, rotation, etc., in response to a degree of pressure on the contact side 116. For instance, a degree of pressure (e.g., a threshold force) exerted on the contact side 116 of the click pad 104 may cause the click pad 104 to travel a first distance 108. The first distance 108 may be measured in terms of positional difference of the contact side 116, the underside 114, an edge, an end, or another point of the click pad 104. In some examples, the first distance 108 may be a distance between travel extremes allowed by a structure of the electronic device 102. In some examples, the click pad 104 may travel approximately in a direction of the pressure (e.g., direction through the click pad 104 from the contact side 116). In some examples, the first distance 108 may be measured as a rotational distance, an axial distance, or another dimensional distance. When the mechanical pressure is relieved in some examples, the click pad 104 may return to a previous position. For instance, the click pad 104 may return to the previous position due to an elasticity of the click pad 104, due to a spring(s) (not shown in FIG. 1) that exert an upward force on the click pad 104, due to a dome switch (not shown in FIG. 1) under the click pad 104, due to foam (not shown in FIG. 1) under the click pad 104, or a combination thereof.

In some examples, travel to the first distance 108 may actuate (e.g., depress) a switch. For instance, the electronic device 102 may include a switch (not shown in FIG. 1) disposed under the click pad 104. In some examples, the switch may be attached to the underside 114 of the click pad 104. In some examples, the switch may be attached to a chassis of the electronic device 102, to a housing (e.g., enclosure, cage, etc.) of the click pad 104, or to a bottom of a well of the electronic device 102 to accommodate the click pad 104. When the click pad 104 is depressed in some examples, the switch may actuate. In some examples, the switch may be coupled to the circuitry 106. For instance, the switch may provide or remove a signal (e.g., voltage, current, etc.) when the switch is actuated. In some examples, the switch may provide the signal to the circuitry 106 or other circuitry (e.g., processor, controller, etc.) when the switch is actuated. The signal may indicate an event (e.g., click, button press, tap, etc.) when the switch is actuated or changes state.

The electronic device 102 includes circuitry 106 disposed under the click pad 104. The circuitry 106, in response to a stylus detection, may activate to reduce click pad 104 travel from a first distance 108 to a second distance 110. In some examples, the circuitry 106 may be attached to the click pad 104 (e.g., disposed on the underside 114 of the click pad 104) or may be attached to a chassis of the electronic device 102 under the click pad 104.

In some examples, the electronic device 102 (e.g., click pad 104, circuitry 106, or a combination thereof) may detect the stylus 112. For instance, the click pad 104 may be a capacitive click pad to perform the stylus detection (e.g., to determine whether a finger or the stylus 112 is in contact with the click pad 104 or within a proximity to (e.g., within a threshold distance from the) click pad 104). For instance, the stylus 112 may exhibit a different detection pattern (e.g., a narrower contact footprint, a different capacitive field change, etc.) than a fingertip. In some examples, the circuitry 106 may include logic circuitry to control the click pad 104 (e.g., determine a contact location on the click pad 104, detect whether the contact corresponds to a fingertip or the stylus 112, activate to reduce click pad travel, or a combination thereof).

In some examples, the electronic device 102 may include circuitry (other than the circuitry 106 or in combination with the circuitry 106, for example) to perform stylus 112 detection. For instance, the electronic device 102 may include a communication interface, processor, or a combination thereof that may detect whether the stylus 112 is being used (e.g., if an active stylus is paired with the electronic device 102). For instance, the electronic device 102 may utilize a communication interface(s) to communicate with the stylus 112 (e.g., an active stylus). In some examples, the electronic device 102 may be in communication with (e.g., coupled to, have a communication link with) the stylus 112. In some examples, the communication interface(s) may include a wireless interface (e.g., Bluetooth® interface, WI-FI® interface, etc.), wired interface (e.g., mobile industry processor interface (MIPI), Universal Serial Bus (USB) interface, etc.), or a combination thereof. In some examples, the communication interface(s) (e.g., MIPI, USB interface, etc.) may be coupled to the circuitry 106, to a processor of the electronic device 102, or a combination thereof. In some examples, the communication interface may include hardware, machine-readable instructions, or a combination thereof to enable a component (e.g., click pad 104, circuitry 106, etc.) of the electronic device 102 to communicate with the stylus 112.

In some examples, the communication interface may enable a wired connection, wireless connection, or a combination thereof to the stylus 112. In some examples, the communication interface may include a network interface card, may include hardware, may include machine-readable instructions, or may include a combination thereof to enable the electronic device 102 to communicate with the stylus 112. In some examples, the electronic device 102 may include an internal bus to communicate the stylus detection from the communication interface to the circuitry 106. Examples of an internal bus include an inter-integrated circuit (I2C) bus and a serial peripheral interface (SPI) bus.

In some examples, the circuitry 106 may activate to reduce click pad 104 travel from the first distance 108 to a second distance 110. In some examples, the circuitry 106 comprises an electromagnetic valve circuit. An electromagnetic valve circuit is a circuit to create an attractive (or repulsive) electromagnetic field. For instance, the circuitry 106 may activate the electromagnetic valve circuit by driving a current through the electromagnetic valve circuit to create the electromagnetic field. In some examples, an electromagnetic valve circuit may include a metallic coil (e.g., a wire coil, a trace coil, or a combination thereof). For instance, the electromagnetic valve circuit may pull the click pad 104 into a depressed state to reduce the travel distance to the second distance 110. The second distance 110 is less than the first distance 108. For instance, the first distance 108 may be 2 millimeters (mm) and the second distance 110 may be 0 mm. Other examples may utilize other distances (e.g., 3 mm to 1 mm, 2.5 mm to 0.5 mm, 4 mm to 0 mm, etc.). In some examples, the electromagnetic valve circuit is attached to the underside 114 of the click pad 104. For instance, the electromagnetic valve circuit may be disposed in a layer (e.g., lower layer) of a printed circuit board (PCB) or printed circuit board assembly (PCBA) that is different from a layer that includes the click pad 104 sensors. In some examples, the click pad 104 may be fabricated with glass, mylar, another material(s), or a combination thereof. In some examples, the click pad 104 may include or may be included in a PCBA with click pad circuitry, circuitry 106, or a combination thereof.

In some examples, the electronic device 102 may include a magnet disposed under the click pad 104 (e.g., under the circuitry 106) to attract the electromagnetic valve circuit when the electromagnetic valve circuit is active. For example, the magnet may be disposed beneath the electromagnetic valve circuit and may be attached to a chassis of the electronic device 102. In some examples, the magnet may be disposed on the underside 114 of the click pad 104 and the electromagnetic valve circuit may be disposed beneath the magnet.

In some examples, the switch may be disabled in response to the stylus detection. For instance, the switch may be disabled, while the stylus 112 is detected, by disregarding a switch signal, blocking a switch signal, overriding a switch signal, holding a switch signal to a state (indicating no switch actuation when a switch actuation actually occurs, for example), or a combination thereof. In some examples, a signal produced by the switch may be overridden with another signal (e.g., voltage state, current state, or a combination thereof) while the stylus 112 is detected. In some examples, event detection circuitry may enter a state that disregards a switch state while the stylus 112 is detected. In some examples, the electronic device 102 (e.g., an operating system (OS)) may disregard a click event or click state while the stylus 112 is detected.

In some examples, the circuitry 106 includes electronic components for performing an operation(s) described herein to perform one, some, or all of the aspects, operations, elements, etc., described in one, some, or all of FIG. 1-7.

FIG. 2 is a diagram illustrating an exploded perspective view of an example of an input device assembly 220 for controlling click pad travel. FIG. 3 is a diagram illustrating a side view of the example of the input device assembly 220. FIG. 4 is a diagram illustrating a front view of the example of the input device assembly 220. FIG. 5 is a diagram illustrating a front view of the example of the input device assembly 220 in a depressed state. FIG. 2, FIG. 3, FIG. 4, and FIG. 5 are described together.

In some examples, the input device assembly 220 may be included in the electronic device 102 described in FIG. 1. The input device assembly 220 may include a click pad 222. The click pad 222 may be an example of the click pad 104 described in FIG. 1.

The input device assembly 220 may include a first electromagnetic valve circuit 224 and a second electromagnetic valve circuit 226. In some examples, the first electromagnetic valve circuit 224 and the second electromagnetic valve circuit 226 may be included in the circuitry 106 described in FIG. 1. The first electromagnetic valve circuit 224, the second electromagnetic valve circuit 226, or a combination thereof may be an example or examples of the electromagnetic valve circuit described in FIG. 1. In this example, the first electromagnetic valve circuit 224 and the second electromagnetic valve circuit 226 are disposed on an underside of the click pad 222. In some examples, the first electromagnetic valve circuit 224 and the second electromagnetic valve circuit 226 may be recessed in the click pad 222. In some examples, a surface (e.g., bottom surface) of the first electromagnetic valve circuit 224, a surface of the second electromagnetic valve circuit 226, or a combination thereof may be flush with an underside of the click pad 222. In some examples, the first electromagnetic valve circuit 224 and the second electromagnetic valve circuit 226 may be included in a layer of a PCB or PCBA that includes the click pad 222.

In some examples, the input device assembly 220 includes a first magnet 230 and a second magnet 232. In this example, the first magnet 230 and the second magnet 232 are disposed on a housing 240 (e.g., chassis, cage, etc.). In some examples, the first magnet 230 and the second magnet 232 may be recessed in the housing 240. In some examples, a surface (e.g., top surface) of the first magnet 230, a surface of the second magnet 232, or a combination thereof may be flush with a surface of the housing 240. For instance, a magnet or magnets may be disposed proud of (e.g., protruding from, on, above, etc.) a housing (e.g., chassis) or may be partially or completely recessed in a housing.

In some examples, the click pad 222 includes a first portion 236 and a second portion 238. In some examples, the first portion 236 may be a first half of the click pad 222 and the second portion 238 may be a second portion 238 of the click pad 222. In some examples, circuitry (e.g., circuitry 106, the first electromagnetic valve circuit 224, the second electromagnetic valve circuit 226, or a combination thereof, etc.) may be disposed on an underside of the first portion 236 of the click pad 222. In some examples, a fulcrum of the click pad 222 is disposed on an underside of the second portion 238 of the click pad 222. For instance, the second portion 238 of the click pad 222 may be a hinge portion. A hinge portion is a portion (e.g., subset, part, etc.) of the click pad 222 from which the click pad 222 may move (e.g., bend, rotate, flex, etc.). For example, the input device assembly 220 may include a pivot 242 (e.g., hinge, stand, rotating structure, hinge spacer, etc.) disposed under the hinge portion.

In some examples, the input device assembly 220 may include a switch 228 disposed under the click pad 222. In some examples, the switch 228 may be an example of the switch described in FIG. 1. In this example, the switch 228 is a dome switch attached to the click pad 222. In some examples, a switch (e.g., dome switch) may be attached to a PCBA (e.g., a side of a PCBA). A dome switch is a switch with a dome structure. The dome structure may serve as a mechanical spring to compress under pressure and expand as pressure is relieved. For instance, the dome structure may compress under pressure on the click pad 222, which may cause the switch 228 to actuate (e.g., signal a click event). In some examples, a switch may be disposed between electromagnetic valve circuits (e.g., the switch 228 may be disposed between the first electromagnetic valve circuit 224 and the second electromagnetic valve circuit 226).

In some examples, the click pad 222 may produce a stylus detection. In some examples, the first electromagnetic valve circuit 224, the second electromagnetic valve circuit 226, or a combination thereof may be circuitry to reduce click pad travel from a first distance to a second distance in response to a stylus detection. For instance, the circuitry may reduce click pad travel from a first distance to a second distance as described in FIG. 1.

In some examples, the switch 228 may be depressed when the click pad travel is reduced to the second distance. For instance, when the first electromagnetic valve circuit 224 and the second electromagnetic valve circuit 226 are activated, the first electromagnetic valve circuit 224 and the second electromagnetic valve circuit 226 may produce an attractive field between the first electromagnetic valve circuit 224 and the first magnet 230, and an attractive field between the second electromagnetic valve circuit 226 and the second magnet 232. The attractive field(s) may draw (e.g., pull) the click pad 222 into the depressed state illustrated in FIG. 5. In some examples, an electromagnetic valve circuit, when activated, may be drawn nearer to a magnet, into contact with a magnet, or a combination thereof. For instance, a gap may exist between an electromagnetic valve circuit and a magnet when the electromagnetic valve circuit is inactive. The gap may be narrowed when the electromagnetic valve circuit is active. In some examples, the switch 228 may be disabled in response to the stylus detection. For instance, the switch 228 may be disabled, while the stylus is detected, by disregarding a switch signal, blocking a switch signal, overriding a switch signal, holding a switch signal to a state (indicating no switch actuation when a switch actuation actually occurs, for example), or a combination thereof.

Figure 6:
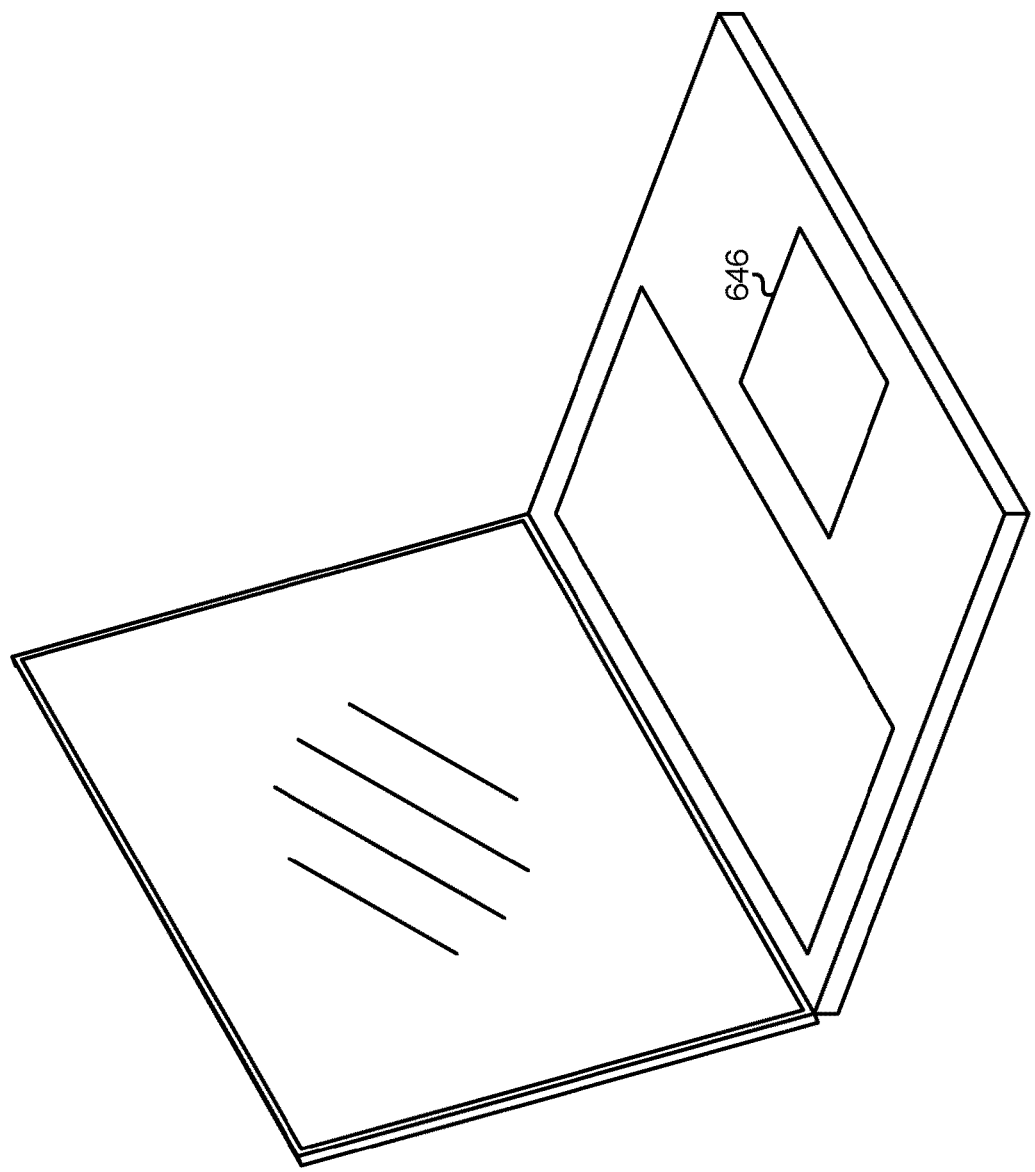
FIG. 6 is a diagram illustrating an example of a computing device for controlling click pad travel.

FIG. 6 is a diagram illustrating an example of a computing device 644 for controlling click pad travel. For instance, the computing device 644 is an example of a laptop computer. The computing device 644 includes a contact-sensitive click pad 646. The contact-sensitive click pad 646 may be utilized to detect a contact of a finger or stylus to produce an input for the computing device 644. In some examples, the click pad 646 may be an example of the click pad 104 described in FIG. 1, the click pad 222 described in FIG. 2, or a combination thereof. In some examples, the input device assembly 220 described in FIG. 2 may be included in the computing device 644.

In some examples, the computing device 644 may include a circuit disposed on an underside of the click pad 646. For instance, the circuit may be an electromagnetic circuit to attract a magnet disposed across from the circuit in response to an activation. In some examples, the computing device 644 may include a switch to be actuated when the click pad 646 is in a depressed state.

In some examples, the computing device 644 may include a controller to produce an activation of the circuit to reduce a travel of the click pad 646 from a first distance to a second distance based on a stylus detection. For instance, the controller may produce an activation in response to a stylus detection. In some examples, the circuit (e.g., electromagnetic valve circuit) may actuate the switch in response to the activation. In some examples, the switch may be disabled when a stylus is detected, when an activation is produced, or a combination thereof.

Figure 7:
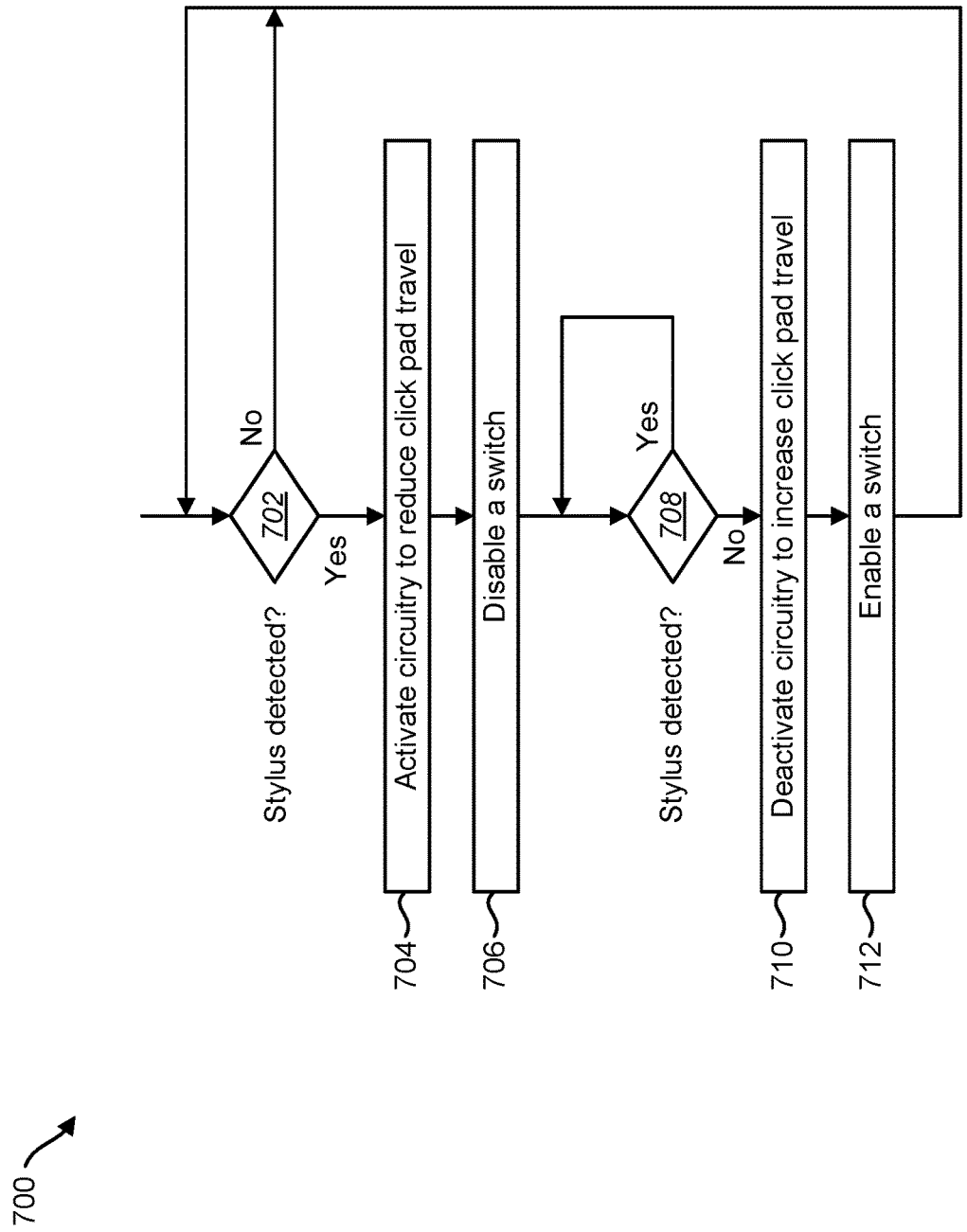
FIG. 7 is a flow diagram illustrating an example of a method for controlling click pad travel.

FIG. 7 is a flow diagram illustrating an example of a method 700 for controlling click pad travel. The method 700 or a method 700 element may be performed by an electronic device, computing device, or apparatus (e.g., electronic device 102, input device assembly 220, or computing device 644, etc.). For example, the method 700 may be performed by the electronic device 102 in FIG. 1, the input device assembly 220 in FIG. 2, the computing device 644 in FIG. 6, or a combination thereof.

At 702, an electronic device may determine whether a stylus is detected. In some examples, the electronic device may determine whether a stylus is detected as described in FIG. 1, FIG. 2, FIG. 3, FIG. 4, FIG. 5, FIG. 6, or a combination thereof. If a stylus is not detected, operation may return to determining whether a stylus is detected at 702 (after a period, for instance).

In a case that a stylus is detected, the electronic device may activate circuitry to reduce click pad travel at 704. In some examples, the electronic device may activate the circuitry as described in FIG. 1, FIG. 2, FIG. 3, FIG. 4, FIG. 5, FIG. 6, or a combination thereof.

At 706, the electronic device may disable a switch. In some examples, the electronic device may disable a switch as described in FIG. 1, FIG. 2, FIG. 3, FIG. 4, FIG. 5, FIG. 6, or a combination thereof.

At 708, the electronic device may determine whether a stylus is detected (has continued to be detected, for instance). In some examples, the electronic device may determine whether a stylus is detected as described in FIG. 1, FIG. 2, FIG. 3, FIG. 4, FIG. 5, FIG. 6, or a combination thereof. If a stylus is detected, operation may return to determining whether a stylus is detected at 708 (after a period, for instance).

In a case that a stylus is not detected (e.g., detection is discontinued), the electronic device may deactivate circuitry to increase click pad travel at 710. For instance, the electronic device may deactivate an electronic valve circuit(s).

At 712, the electronic device may enable a switch. For instance, the electronic device may enable the switch by utilizing a switch signal, unblocking a switch signal, discontinue overriding a switch signal, releasing a switch signal state, tracking a click event, or a combination thereof.

In some examples, when an active stylus comes within a distance (e.g., threshold distance, 6 inches, 3 inches, 2 inches, 1 inch, etc.) to the click pad, the stylus may provide a signal (e.g., a hovering state signal) to activate a circuit (e.g., electromagnetic valve circuit). In some examples, click pad travel may be reduced (e.g., the click pad may be held to a fixed position) by a magnet. In this state, the click pad may have little or no travel (e.g., vertical travel), which may hold the click pad to provide an enhanced stylus interface (e.g., the stylus may be used without triggering a click).

In some examples, an electromagnetic valve circuit may be built into a PCBA (without a flexible printed circuit board assembly (FPCA) or membrane, for instance). Some examples of the techniques described herein may be relatively inexpensive to manufacture. For instance, some examples of the structures described herein may be provided without the expense of a force pad. Some examples may be manufactured without a linear resonant actuator (LRA), without a piezo actuator, or without a combination thereof for haptics feedback. Some examples may be utilized without a magnetic plunger (e.g., solenoid). Some examples of the techniques described herein may be utilized without relearning operations or complex gestures.

As used herein, items described with the term "or a combination thereof" may mean an item or items. For example, the phrase "A, B, C, or a combination thereof" may mean any of: A (without B and C), B (without A and C), C (without A and B), A and B (without C), B and C (without A), A and C (without B), or all of A, B, and C.

While various examples are described herein, the described techniques are not limited to the examples. Variations of the examples are within the scope of the disclosure. For example, operation(s), aspect(s), or element(s) of the examples described herein may be omitted or combined.

What is claimed is:
1. An electronic device, comprising:
a click pad;
circuitry disposed under the click pad, wherein the circuitry, in response to a stylus detection, is to activate to reduce click pad travel from a first distance to a second distance by depressing the click pad; and a dome switch coupled to the circuitry and disposed under the click pad, wherein the dome switch is disabled in response to the stylus detection.

2. The electronic device of claim 1, wherein the circuitry comprises an electromagnetic valve circuit.

3. The electronic device of claim 2, further comprising a magnet disposed under the click pad to attract the electromagnetic valve circuit when the electromagnetic valve circuit is active.

4. The electronic device of claim 3, wherein the magnet is disposed beneath the electromagnetic valve circuit and is attached to a chassis of the electronic device.

5. The electronic device of claim 2, wherein the electromagnetic valve circuit is attached to an underside of the click pad.

6. The electronic device of claim 1, wherein the switch is attached to an underside of the click pad.

7. The electronic device of claim 1, wherein the circuitry is disposed on an underside of a first portion of the click pad and a fulcrum of the click pad is disposed on an underside of a second portion of the click pad.

8. The electronic device of claim 1, wherein the click pad is a capacitive click pad to perform the stylus detection.

9. An input device assembly, comprising:
a click pad having a hinge portion;
a pivot disposed under the hinge portion;
circuitry to reduce click pad travel from a first distance to a second distance in response to a stylus detection; and
a dome switch coupled to the circuitry and disposed under the click pad, wherein the dome switch is disabled in response to the stylus detection,
wherein the switch is depressed when the click pad travel is reduced to the second distance.

10. The input device assembly of claim 9, wherein the click pad is to produce the stylus detection.

11. A computing device, comprising:
a contact-sensitive click pad;
a circuit disposed on an underside of the click pad;
a controller to produce an activation of the circuit to reduce a travel of the click pad from a first distance to a second distance, by depressing the click pad, based on a stylus detection; and
a dome switch coupled to the circuit and disposed under the click pad, wherein the dome switch is to be actuated when the click pad is in a depressed state, and wherein the dome switch is disabled in response to the stylus detection.

12. The computing device of claim 11, wherein the circuit is an electromagnetic circuit to attract a magnet disposed across from the circuit in response to the activation.

13. The computing device of claim 12, wherein the circuit is to actuate the switch in response to the activation.

* * * * *